United States Patent
Peng et al.

(10) Patent No.: US 10,811,031 B2
(45) Date of Patent: Oct. 20, 2020

(54) METHOD AND DEVICE FOR OBTAINING AMPLITUDE OF SOUND IN SOUND ZONE

(71) Applicant: BAIDU ONLINE NETWORK TECHNOLOGY (BEIJING) CO., LTD., Beijing (CN)

(72) Inventors: Hanying Peng, Beijing (CN); Nengjun Ouyang, Beijing (CN)

(73) Assignee: Baidu Online NetworkTechnology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/727,309

(22) Filed: Dec. 26, 2019

(65) Prior Publication Data
US 2020/0211582 A1    Jul. 2, 2020

(30) Foreign Application Priority Data
Dec. 28, 2018 (CN) .......................... 2018 1 1628633

(51) Int. Cl.
*G10L 21/0316* (2013.01)
*G10L 15/22* (2006.01)
*G10L 19/022* (2013.01)

(52) U.S. Cl.
CPC .......... *G10L 21/0316* (2013.01); *G10L 15/22* (2013.01); *G10L 19/022* (2013.01)

(58) Field of Classification Search
None
See application file for complete search history.

(56) References Cited

U.S. PATENT DOCUMENTS

| | | | | |
|---|---|---|---|---|
| 4,531,228 A | * | 7/1985 | Noso | G10L 25/87 |
| | | | | 704/275 |
| 6,363,344 B1 | * | 3/2002 | Higuchi | G10L 21/0208 |
| | | | | 379/388.04 |
| 2016/0071529 A1 | * | 3/2016 | Kato | G10L 25/18 |
| | | | | 704/233 |
| 2016/0314785 A1 | * | 10/2016 | Matsuoka | G10L 21/0216 |
| 2018/0096696 A1 | * | 4/2018 | Mixter | G10L 25/51 |

* cited by examiner

*Primary Examiner* — Paul W Huber
(74) *Attorney, Agent, or Firm* — Fay Sharpe, LLP

(57) ABSTRACT

Embodiments of the present disclosure disclose a method and a device for obtaining an amplitude for a sound zone, a related electronic device and a storage medium. The method includes the following. Speech data of a target sound zone is obtained in real time. The speech data includes audio signals corresponding to a plurality of sampling points. The audio signals are stored by comparing an amplitude of a current audio signal to be stored with an amplitude of each stored audio signal to determine whether to store the current audio signal according to a comparison result. A current amplitude for the target sound zone is calculated according to amplitudes of all stored audio signals.

12 Claims, 3 Drawing Sheets

--- collecting speech data of a target sound zone in real time, the speech data includes audio signals corresponding to a plurality of sampling points  — 110 storing the audio signals by comparing an amplitude of a current audio signal to be stored with an amplitude of each stored audio signal to determine whether to store the current audio signal according to a comparison result — 120 calculating a current amplitude for the target sound zone according to amplitudes of all stored audio signals — 130

METHOD AND DEVICE FOR OBTAINING AMPLITUDE OF SOUND IN SOUND ZONE

CROSS REFERENCE TO RELATED APPLICATIONS

This application claims priority and benefits to Chinese Application No. 201811628633.1, filed on Dec. 28, 2018, the entire content of which is incorporated herein by reference.

FIELD

Embodiments of the present disclosure relate to a field of an on-vehicle system technology, and more particularly, to a method and a device for obtaining an amplitude of sound in a sound-zone, a related electronic device and a storage medium.

BACKGROUND

A conventional technical solution of on-vehicle speech recognition only provides services to a driver. A front microphone is orientated to a seat of the driver. Furthermore, conventional application functions such as on-vehicle navigation, music and phone call services are designed to provide services to the driver. As a result, it is required to acquire and recognize a speech signal from the driver. As requirements of applications increase, a solution of on-vehicle four sound zones is proposed. The solution of on-vehicle four sound zones is an on-vehicle speech system that may satisfy requirements for all seats in the vehicle. The vehicle may include a front sound zone, a rear sound zone, a left sound zone and a right sound zone, such that sounds from the four sound zones may be picked up separately. Consequently, speech control of different functions may be realized for different sound zones by identifying the sound zone from which a speech signal comes.

SUMMARY

Embodiments of the present disclosure provide a method for obtaining an amplitude for a sound zone, including:
collecting speech data of a target sound zone in real time, the speech data including audio signals corresponding to a plurality of sampling points;
storing the audio signals by comparing an amplitude of a current audio signal to be stored with an amplitude of each stored audio signal to determine whether to store the current audio signal; and
calculating a current amplitude for the target sound zone according to amplitudes of all stored audio signals.

Embodiments of the present disclosure further provide a device for obtaining an amplitude for a sound zone, including:
a collecting module, configured to collect speech data of a target sound zone in real time, the speech data comprising audio signals corresponding to a plurality of sampling points;
a storing module, configured to store the audio signals by comparing an amplitude of a current audio signal to be stored with an amplitude of each stored audio signal to determine whether to store the current audio signal; and
an amplitude calculating module, configured to calculate a current amplitude for the target sound zone according to amplitudes of all stored audio signals.

Embodiments of the present disclosure further provide an electronic device, including:
one or more processors;
a memory, configured to store one or more programs,
in which the one or more processors are configured to execute the method for obtaining an amplitude for a sound zone according to any one of the above embodiments, when the one or more programs are executed by the one or more processors.

Embodiments of the present disclosure further provide a computer readable storage medium having a computer program stored thereon. The method for obtaining an amplitude for a sound zone according to any one of the above embodiments is executed when the computer program is executed by a processor.

DETAILED DESCRIPTION

Figure 1:
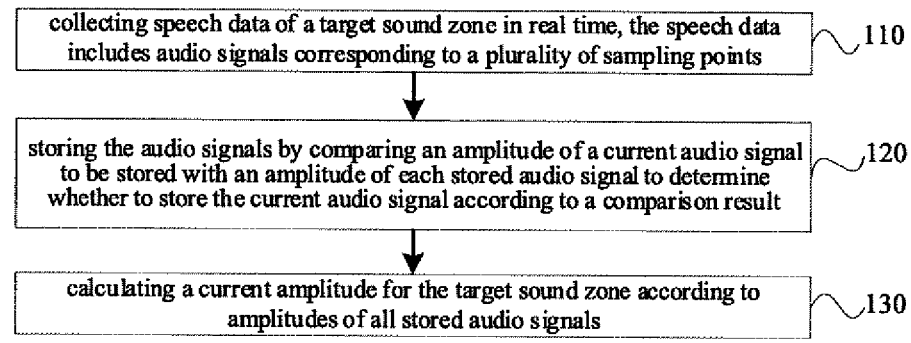
FIG. 1 is a flowchart illustrating a method for obtaining an amplitude for a sound zone according to embodiments of the present disclosure.

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

Since four microphones corresponding to the four sound zones of the vehicle are placed in a same space, a certain degree of sound isolation may be formed between speech from the four sound zones through a microphone module algorithm. However, a part of speech from one of the four sound zones may spread to other speed zones. Consequently, recognition on a speech signal from a different sound zone may be affected. For instance, when a speech signal is used to activate a function for a sound zone, it is possible that an on-vehicle speech engine may mistakenly activate the function for the other three sound zones.

In related arts, the sound zone from which the speed signal comes may be identified by using a preset algorithm based on a parameter such as an amplitude of the speed signal from each of the four sound zones of the vehicle. The amplitude of the speed signal from each sound zone may be used to evaluate a loudness level of the speed signal from each microphone, and thus may be provide a data basis to correct false wake up by the speech engine. However, in related arts, the amplitude of the sound signal from the sound zone is acquired by performing a calculation on all speech signals in a period of time. This method not only results in a great consumption of system performance due to a large amount of calculation, but also generates an inaccurate calculation result, thereby failing to satisfy a requirement of accurately identifying the sound zone from which the speech signal comes.

Therefore, embodiments of the present disclosure provide a method and a device for obtaining an amplitude for a sound zone, a related electronic device and a storage medium, to solve a technical problem of an inaccurate calculation result of the amplitude and a large amount of calculation in related arts when determining the amplitude for the sound zone using all speech signals.

With the method and the device for obtaining an amplitude for a sound zone, a related electronic device and a storage medium according to embodiments of the present disclosure, during storing the audio signals included in the speech data of the target sound zone collected in real time in sequence, the amplitude of the current audio signal to be stored is compared with the amplitude of each stored audio signal in real time to determine whether to store the current audio signal. That is, the current audio signal is selectively stored, rather than storing all of the audio signals. The amplitude for the target sound zone is calculated according to amplitudes of all stored audio signals. Consequently, an amplitude for the sound zone may be acquired accurately. In addition, a source sound zone of the speech data may be located accurately according to the amplitude, thereby solving a defect of false wake-up resulted from an insufficient isolation of four sound zones, and providing a data basis to correct a false wake up by a speech engine. In addition, system resources may be saved and an amount of calculation may be small.

FIG. 1 is a flowchart illustrating a method for obtaining an amplitude for a sound zone according to embodiments of the present disclosure. The above embodiment may be applicable to an on-vehicle terminal for obtaining amplitudes for different sound zones of the vehicle, such that a sound zone from where a speech signal comes may be identified according to the amplitude of each sound zone. The method may be executed by a corresponding device for obtaining an amplitude for a sound zone. The device may be realized by software and/or hardware and may be equipped on an electronic device, for example, an on-vehicle terminal.

As illustrated in FIG. 1, the sound-zone amplitude acquisition method according to this embodiment of the present disclosure may include the followings.

At block 110, speech data of a target sound zone is collected in real time. The speech data includes audio signals corresponding to a plurality of sampling points.

Generally, a vehicle may include a front sound zone, a rear sound zone, a left sound zone and a right sound zone. Each sound zone may be correspondingly provided with a microphone to pick up sounds from the four sound zones. For example, four microphones may be arranged at four doors of the vehicle, at top or bottom of a window of the door. After the speech data is collected by each microphone, the speech data may be sequenced based on a sequencing rule. For example, first and second pieces of speech data may be collected by a first microphone, third and fourth pieces of speech data may be collected by a second microphone, fifth and sixth pieces of speech data may be collected by a third microphone, seventh and eighth pieces of speech data may be collected by a fourth microphone, and ninth and tenth pieces of recorded data may be collected by the first microphone, and so forth. These pieces of speech data collected by the microphones may be sequenced in this manner.

Consequently, when the speech data of the target sound zone is collected in real time, the speech data collected by the four microphones may be read by a speech acquisition interface on the vehicle in real time. The speech data of the target sound zone may be separated from the read speech data in real time according to the sequencing rule of the speech data collected by the microphones. It should be noted that the target sound zone may be one of the four sound zones of the vehicle. In addition, since the speech data is acquired by sampling a piece of entire audio data at a certain sampling rate, the read speech data of the target sound zone includes audio signals corresponding to the plurality of sampling points. For example, a frequency of acquiring the speech data of the target sound zone may be 20 milliseconds (ms). That is, a time length of the acquired speech data may be 20 milliseconds (ms). 600 sampling points may be included in the speech data having the time length of 20 ms. Each sampling point corresponds to an audio signal, such that a value corresponding to each sampling point is the amplitude of the audio signal.

At block 120, the audio signals are stored by comparing an amplitude of a current audio signal to be stored with an amplitude of each stored audio signal to determine whether to store the current audio signal.

Each sound zone may correspond to a respective storage space which is configured for storing the speech data generated from the sound zone. For example, for a sound zone, a container for storing the speech data may be created in advance. During the storing, the audio signals corresponding to the sampling points of the speech data may be stored in sequence.

In detail, for a current audio signal to be stored, the amplitude of the current audio signal to be stored may be compared with the amplitude of each stored audio signal, such that it may be determined whether to store the current audio signal according to a result of the comparing. That is, selected audio signals may be stored, but not all audio signals are stored. It should be noted that, in related arts, the amplitude for the sound zone may be obtained through a calculation performed on all audio signals within a period of time. However, on the one hand, some audio signals may cause interference to the determination of the amplitude for the sound zone, resulting in an inaccurate determination of the amplitude using all of the audio signals. On the other hand, using all of the audio signals may cause a large amount of calculation and require a powerful system performance. However, in embodiments of the present disclosure, instead of storing all of the acquired audio signals corresponding to the sampling points, the audio signal selected according to a comparison result between the amplitude of the current audio signal to be stored and the amplitude of each stored audio signal may be stored. For example, based on a storing rule, an audio signal having a low amplitude may be discarded according to the comparison relationship of amplitudes. That is, the audio signal having the low amplitude is not stored, thereby eliminating interferences and reducing the amount of calculation.

In some examples, the audio signals corresponding to the sampling points in the speech data of the target sound zone collected in real time are sequentially inserted into a prebuilt container corresponding to the target sound zone. During the inserting, when the amplitude of the current audio signal to be stored is greater than a minimum amplitude of all inserted audio signal of the container, the amplitude of the current audio signal to be stored is assigned to the minimum amplitude. Otherwise, the current audio signal to be stored is discarded. Consequently, the audio signal having the lowest amplitude in the speech data collected in real time may be discarded cyclically, which may keep an accuracy of calculating the amplitude for the sound zone subsequently. In addition, a portion with a high volume of the speech data from sound zone may be maintained, thereby providing precise data basis for accurately identifying the sound zone from which the speech signal comes.

At block 130, a current amplitude for the target sound zone is calculated according to amplitudes of all stored audio signals.

For example, the amplitudes of all stored audio signals may be averaged to obtain an average value. The current amplitude for the target sound zone may be calculated according to the average value. In addition, since the average value of the amplitudes of all stored audio signals does not directly reflect the volume level of the user, it is necessary to mathematically convert the average value into the volume level of the user. That is, the current amplitude for the target sound zone is obtained, for example, through a calculation according to a formula F=256*A, where F represents the amplitude for the sound zone and A represents the average value of the amplitudes of all stored audio signals.

In embodiments of the present disclosure, during sequentially storing the audio signals in the speech data of the target sound zone collected in real time, the amplitude of the current audio signal to be stored is compared with the amplitude of each stored audio signal to determine whether to store the current audio signal according to the comparison result. Therefore, the selected current audio signal to be stored may be stored, rather than storing all of the audio signals. The current amplitude for the target sound zone may be calculated according to the amplitudes of all stored audio signals and a preset rule. Consequently, the amplitude for the sound zone may be acquired accurately such that the sound zone from which the speech data comes may be determined accurately according to the amplitude for the sound zone. Therefore, a defect of false wake up resulted from an insufficient isolation of four sound zones may be solved and a data basis may be provided for correcting a false wake up by a speech engine, such that system resources may be saved and an amount of calculation may be small.

Figure 2:
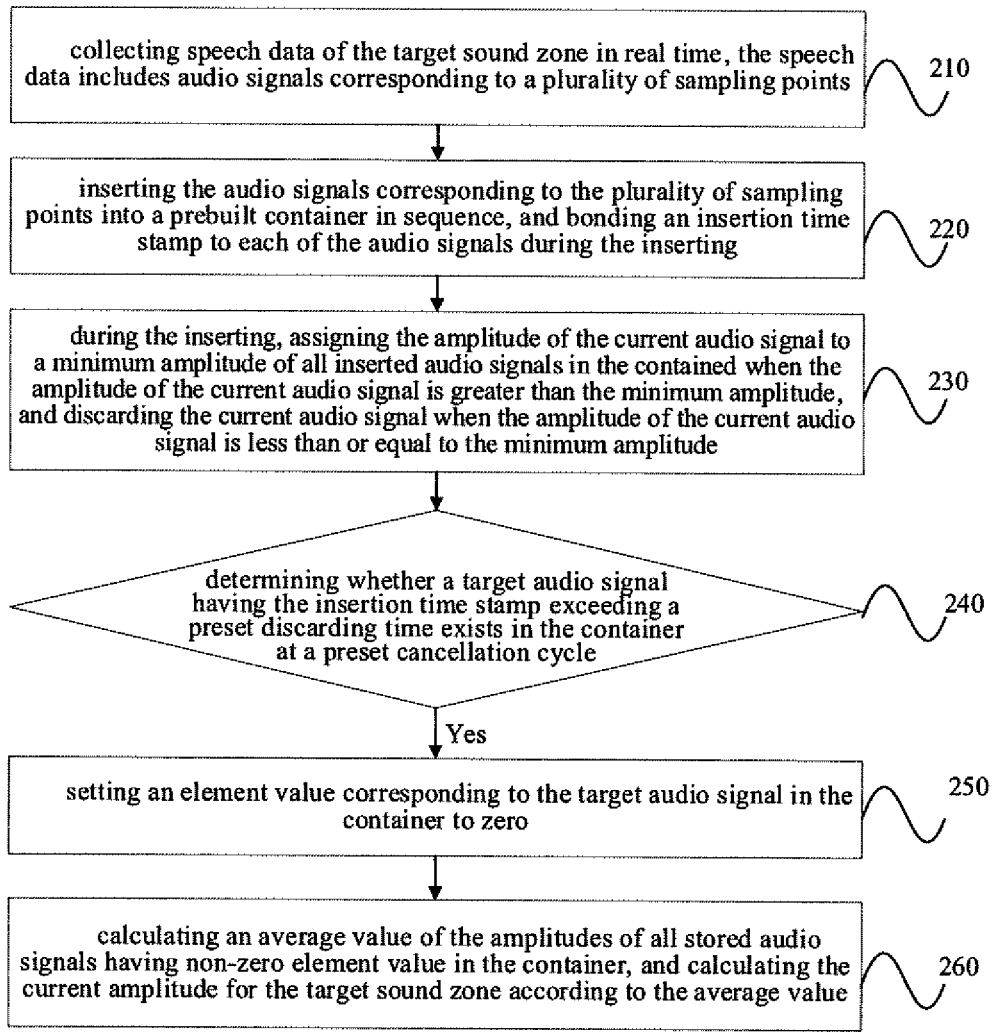
FIG. 2 is a flowchart illustrating a method for obtaining an amplitude for a sound zone according to embodiments of the present disclosure.

FIG. 2 is a flowchart illustrating a method for obtaining an amplitude for a sound zone according to embodiments of the present disclosure. The embodiment is based on the foregoing embodiment. As illustrated in FIG. 2, the method for obtaining an amplitude for a sound zone may include the following.

At block 210, the speech data of the target sound zone is collected in real time. The speech data includes audio signals corresponding to a plurality of sampling points.

At block 220, the audio signals corresponding to the plurality of sampling points are inserted into a prebuilt container in sequence, and an insertion time stamp is bound to each of the audio signals during the inserting.

Due to timeliness of the speech data collected by the on-vehicle terminal, the speech data acquired a certain period of time ago is meaningless to the calculation of the amplitude of the current sound zone. Consequently, it is necessary to periodically calculate a time duration from a time point of storing the speech data in the container for timely cleaning the speech data. For example, the speech data to be cleaned may be determined based on the time point when the speech data is stored and a present time point. Therefore, it is necessary to record the time point when the speech data is stored in the container. For example, when an audio signal corresponding to a sampling point in the speech data is inserted into the container, the present time point may be regarded as the insertion time stamp corresponding to the audio signal.

At block 230, during the inserting, the amplitude of the current audio signal is assigned to a minimum amplitude of inserted audio signals in the container when the amplitude of the current audio signal is greater than the minimum amplitude and the current audio signal is discarded when the amplitude of the current audio signal is less than or equal to the minimum amplitude.

By comparing a magnitude relation between the amplitude of the current audio signal and the amplitude of each inserted audio signal in the container, an audio signal having a low amplitude may be discarded and not stored, thereby eliminating some interferences and reducing an amount of calculation.

At block 240, it is determined whether a target audio signal having the insertion time stamp exceeding a preset discarding time exists in the contained at a preset cancellation cycle. If it is detected that the target audio signal exists, a block 250 may be performed. If it is detected that the target audio signal does not exist, no cancellation is needed.

At block 250, an element value corresponding to the target audio signal in the container is set to zero.

To ensure the timeliness of the speech data stored in the container, it is necessary to periodically check whether an unqualified speech data exists at a preset cycle. For example, the preset cycle may be set according to actual demands. For example, an automatically running timer at a preset time interval may be set in advance. The preset time interval may be the preset cycle. When the timer is running, a difference between an insertion time stamp corresponding to each audio signal in the container and a present time stamp may be detected to determine whether the difference is greater than the preset discarding time. If the different is greater than the preset discarding time, it is indicated that the audio signal is unqualified. Therefore, the audio signal may be marked as the target audio signal. The target audio signal may be gathered as a preset set of target audio signals.

If the set of target audio signals is not empty, it is indicated that all target audio signals in the set are expired. It is required to delete the target audio signals in the set of target audio signals from the container. For example, an element value corresponding to the amplitude of the target audio signal in the container may be set to zero to delete the target audio signal. Values in the container may be updated, thereby ensuring an accuracy of subsequently calculating the amplitude for the sound zone.

At block 260, an average value of the amplitudes of all stored audio signals having non-zero element values in the container is calculated, and the current amplitude for the target sound zone is calculated according to the average value.

In embodiments, the average value of the amplitudes of all stored audio signals having non-zero element values in the current container may be calculated. The amplitude for the sound zone may be calculated according to a formula F=256*A, where F represents the amplitude for the sound zone and A represents the average value of the amplitudes of all stored audio signals having non-zero element values in the current container.

In embodiments, when the audio signal is stored to the container, the insertion time stamp may be bound to the audio signal. The unqualified audio signal that is expired may be deleted from the container through a periodical detection to ensure timeliness of the speech data in the container and to ensure an accurate subsequent calculation of the amplitude for the sound zone.

Figure 3:
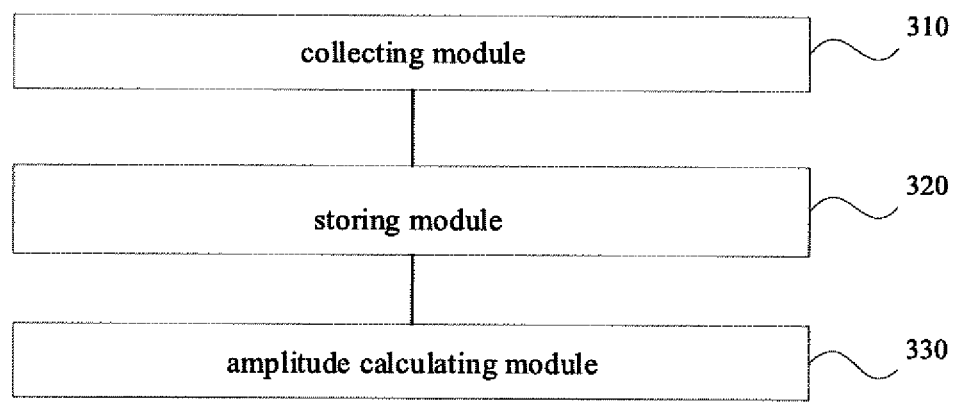
FIG. 3 is a schematic diagram illustrating a device for obtaining an amplitude for a sound zone according to embodiments of the present disclosure.

FIG. 3 is a schematic diagram illustrating a device for obtaining an amplitude for a sound zone according to embodiments of the present disclosure. As illustrated in FIG. 3, the device includes a collecting module 310, a storing module 320 and an amplitude calculating module 330.

The collecting module 310 is configured to collect speech data of a target sound zone in real time. The speech data includes audio signals corresponding to a plurality of sampling points.

The storing module 320 is configured to store the audio signals by comparing an amplitude of a current audio signal to be stored with an amplitude of each stored audio signal to determine whether to store the current audio signal.

The amplitude calculating module 330 is configured to calculate a current amplitude for the target sound zone according to amplitudes of all stored audio signals.

In embodiment, during the inserting in sequence by the storing module, the audio signals included in the speech data of the target sound zone collected in real time by the collecting module, the amplitude of the audio signal to be stored is compared with the amplitude of each stored audio signal in real time to determine whether to store the current audio signal according to a comparison result. Therefore, a selected audio signal to be stored may be stored, rather than storing all of the audio signals to be stored. The current amplitude for the target sound zone may be calculated according to amplitudes of all stored audio signals. Consequently, the amplitude for the sound zone may be acquired accurately such that the sound zone from where the speech data comes may be determined accurately according to the amplitude for the sound zone. Therefore, a defect of false wake up resulted from an insufficient isolation of four sound zones may be solved and a data basis may be provided for correcting a false wake up by a speech engine, such that system resources may be saved and an amount of calculation may be small.

On the basis of the foregoing embodiment, the storing module may be further configured to store the audio signals by inserting the audio signals corresponding to the plurality of sampling points into a prebuilt container in sequence; and during the inserting, assigning the amplitude of the current audio signal to a minimum amplitude of inserted audio signals in the container when the amplitude of the current audio signal is greater than the minimum amplitude and discarding the current audio signal when the amplitude of the current audio signal is less than or equal to the minimum amplitude.

On the basis of the foregoing embodiment, the device further includes a time stamp adding module, a detecting module and a cancelling module. The time stamp adding module is configured to bind an insertion time stamp to each of the audio signals during the inserting. The detecting module is configured to detect whether a target audio signal having the insertion time stamp exceeding a preset discarding time exists in the container at a preset cancellation cycle. The cancelling module is configured to set an element value corresponding to the the target audio signal in the container to zero when the target audio signal exists.

On the basis of the foregoing embodiment, the amplitude calculating module is further configured to calculate an average value of the amplitudes of all stored audio signals having non-zero element values in the container and calculate the current amplitude for the target sound zone according to the average value.

The device for obtaining an amplitude for a sound zone according to embodiments of the present disclosure may be configured to perform the method for obtaining an amplitude for a sound zone according to any one of the embodiments of the present disclosure, which has functional modules for implementing the method and beneficial effects corresponding to the method.

Figure 4:
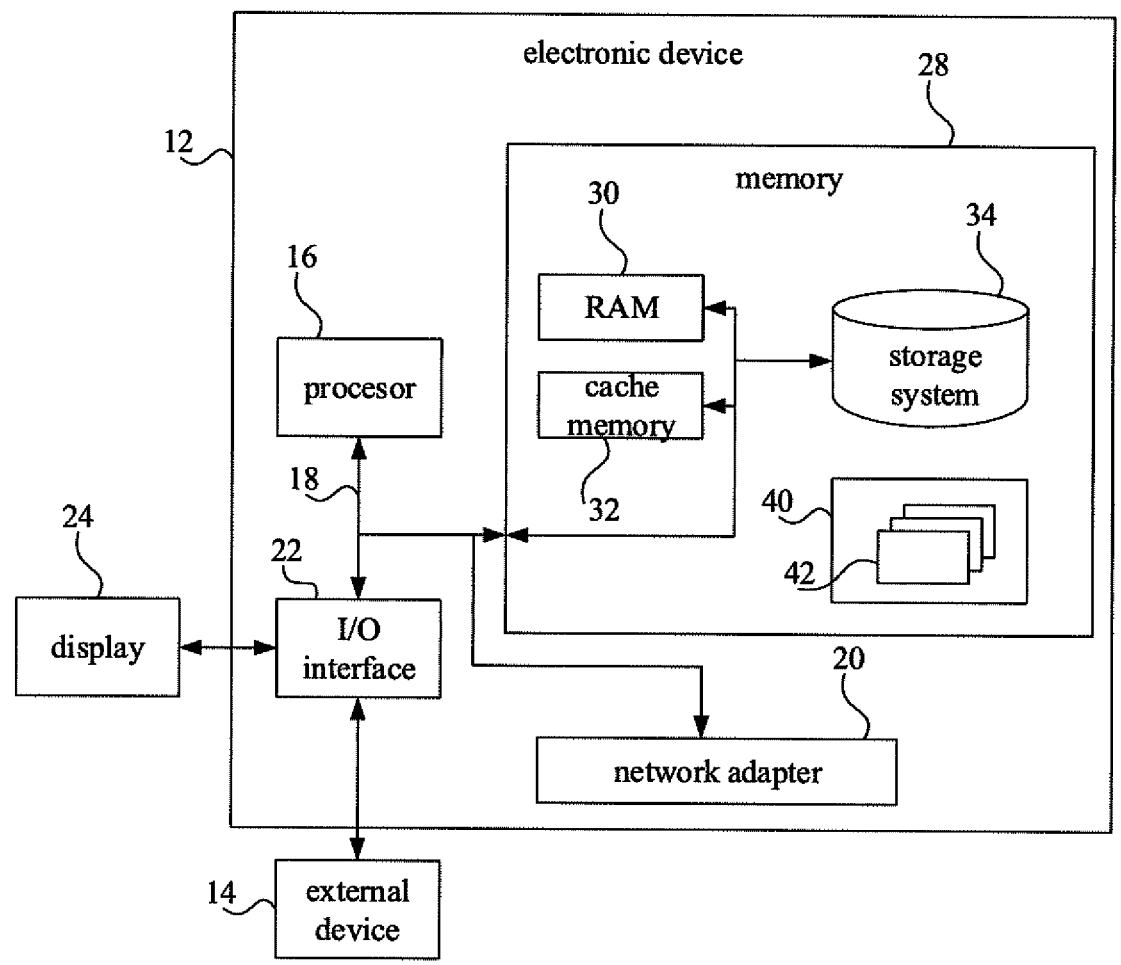
FIG. 4 is a schematic diagram illustrating an electronic device according to embodiments of the present disclosure.

FIG. 4 is a schematic diagram illustrating an electronic device according to embodiments of the present disclosure. A block diagram of an exemplary electronic device 12 for implementing embodiments of the present disclosure is illustrated in FIG. 4. The electronic device 12 illustrated in FIG. 4 is only illustrated as an example, and should not be considered as any limitation on the function and the usage range of embodiments of the present disclosure.

As illustrated in FIG. 4, the electronic device 12 may be in the form of a general-purpose computing apparatus. The electronic device 12 may include, but not limited to, one or more processors or processing units 16, a memory 28, and a bus 18 connecting different system components (including the memory 28 and the processing unit 16).

The bus 18 represents one or more of several types of bus architectures, including a memory bus or a memory control bus, a peripheral bus, a graphic acceleration port bus, a processor bus, or a local bus using any bus architecture in a variety of bus architectures. For example, these architectures include, but are not limited to, an industry standard architecture (ISA) bus, a micro-channel architecture (MCA) bus, an enhanced ISA bus, a video electronics standards association (VESA) local bus, and a peripheral component interconnect (PCI) bus.

Typically, the electronic device 12 may include multiple kinds of computer-readable media. These media may be any storage media accessible by the electronic device 12, including transitory or non-transitory storage medium and movable or immovable storage medium.

The memory 28 may include a computer-readable medium in a form of volatile memory, such as a random-access memory (RAM) 30 and/or a high-speed cache memory 32. The electronic device 12 may further include other transitory/non-transitory storage media and movable/unmovable storage media. In way of example only, the storage system 34 may be used to read and write from and to non-removable and non-volatile magnetic media (not illustrated in FIG. 4, commonly referred to as "hard disk drives"). Although not illustrated in FIG. 4, it may be provided a disk driver for reading and writing from and to movable and non-volatile magnetic disks (e.g. "floppy disks"), as well as an optical driver for reading and writing from and to movable and non-volatile optical disks (e.g. CD-ROM, DVD-ROM, or other optical media). In these cases, each driver may be connected to the bus 18 via one or more data medium interfaces. The memory 28 may include at least one program product. The program product has a set of (for example at least one) program modules. The program modules may be configured to perform the functions of embodiments of the present disclosure.

A program/utility 40 with a set of (at least one) program modules 42 may be stored in memory 28. The program modules 42 may include, but not limit to, an operating system, one or more application programs, other program modules and program data. Any one or a combination of above examples may include an implementation in a network environment. The program modules 42 are generally configured to implement functions and/or methods described in embodiments of the present disclosure.

The electronic device 12 may also communicate with one or more external devices 14 (e.g., a keyboard, a pointing device, a display 24, and etc.) and may also communicate with one or more devices that enables a user to interact with the electronic device 12, and/or any device (e.g., a network card, a modem, and etc.) that enables the electronic device 12 to communicate with one or more other computing devices. This kind of communication can be accessed by the input/output (I/O) interface 22. In addition, the electronic device 12 may be connected to and communicate with one or more networks such as a local area network (LAN), a wide area network (WAN) and/or a public network such as the Internet through a network adapter 20. As illustrated in the figure, the network adapter 20 communicates with other modules of the electronic device 12 over the bus 18. It should be understood that although not shown in the figure, other hardware and/or software modules may be used in combination with the electronic device 12, including but not limited to, microcode, device drivers, redundant processing units, external disk drive arrays, RAID systems, tape drives, as well as data backup storage systems and the like.

The processing 16 may perform various functional applications and data processing by running programs stored in the memory 28, for example, to perform the method for obtaining an amplitude for a sound zone according to embodiments of the present disclosure. The method includes the following.

Speech data of a target sound zone is obtained in real time. The speech data include audio signals corresponding to a plurality of sampling points. The audio signals are stored by comparing an amplitude of a current audio signal to be stored with an amplitude of each stored audio signal to determine whether to store the current audio signal. A current amplitude for the target sound zone is calculated according to amplitudes of all stored audio signals.

Embodiment of the present disclosure provide a storage medium including computer executable instructions. When the computer executable instructions are executed by a computer processor, a method for obtaining an amplitude for a sound zone may be performed. The method includes the following. Speech data of a target sound zone is obtained in real time. The speech data includes audio signals corresponding to a plurality of sampling points. The audio signals are stored by comparing an amplitude of a current audio signal to be stored with an amplitude of each stored audio signal to determine whether to store the current audio signal according to a comparison result. A current amplitude for the target sound zone is calculated according to amplitudes of all stored audio signals.

Certainly, with respect to the storage medium including a computer executable instruction according to embodiments of the present disclosure, the computer executable instruction is not limited to the method operations as described above, and may also perform related operations of the method for obtaining an amplitude for a sound zone according to any one of the embodiments of the present disclosure.

The computer storage medium according to this embodiment of the present disclosure may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing programs. The programs may be used by an instruction executed system, apparatus or device, or a connection thereof.

The computer readable signal medium may include a data signal propagating in baseband or as part of carrier which carries a computer readable program codes. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport programs used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages. The programming language includes an object oriented programming language, such as Java, Smalltalk, C++, as well as conventional procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (LAN) or a Wide Area Network (WAN).

It should be noted that, the above are only preferred embodiments and applied technical principles of the present disclosure. Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for obtaining an amplitude for a sound zone, comprising:
   collecting speech data of a target sound zone in real time, the speech data comprising audio signals corresponding to a plurality of sampling points;
   storing the audio signals by comparing an amplitude of a current audio signal to be stored with an amplitude of each stored audio signal to determine whether to store the current audio signal; and
   calculating a current amplitude for the target sound zone according to amplitudes of all stored audio signals.

2. The method according to claim 1, wherein comparing the amplitude of the current audio signal to be stored with the amplitude of each stored audio signal to determine whether to store the current audio signal comprising:
inserting the audio signals corresponding to the plurality of sampling points into a prebuilt container in sequence; and
during the inserting, assigning the amplitude of the current audio signal to a minimum amplitude of inserted audio signals in the container, in response to determining that the amplitude of the current audio signal is greater than the minimum amplitude; and discarding the current audio signal, in response to determining that the amplitude of the current audio signal is less than or equal to the minimum amplitude.

3. The method according to claim 2, further comprising:
binding an insertion time stamp to an amplitude of each of the audio signals during the inserting;
detecting whether a target audio signal having the insertion time stamp exceeding a preset discarding time exists in the container at a preset cancellation cycle; and
in response to determining that the target audio signal exists, setting an element value corresponding to the target audio signal in the container to zero.

4. The method according to claim 3, wherein calculating the amplitude for the target sound zone according to the amplitudes of all stored audio signals comprising:
calculating an average value of the amplitudes of all stored audio signals having non-zero element values in the container, and calculating the current amplitude for the target sound zone according to the average value.

5. An electronic device, comprising:
one or more processors;
a memory, configured to store one or more programs, wherein when the one or more programs are executed by the one or more processors, the one or more processors are configured to:
collect speech data of a target sound zone in real time, the speech data comprising audio signals corresponding to a plurality of sampling points;
store the audio signals by comparing an amplitude of a current audio signal to be stored with an amplitude of each stored audio signal to determine whether to store the current audio signal; and
calculate a current amplitude for the target sound zone according to amplitudes of all stored audio signals.

6. The electronic device of claim 5, wherein the one or more processors are configured to compare the amplitude of the current audio signal to be stored with the amplitude of each stored audio signal to determine whether to store the current audio signal by:
inserting the audio signals corresponding to the plurality of sampling points into a prebuilt container in sequence; and
during the inserting, assigning the amplitude of the current audio signal to a minimum amplitude of inserted audio signals in the container, in response to determining that the amplitude of the current audio signal is greater than the minimum amplitude; and discarding the current audio signal, in response to determining that the amplitude of the current audio signal is less than or equal to the minimum amplitude.

7. The electronic device of claim 6, wherein the one or more processors are further configured to:
bind an insertion time stamp to an amplitude of each of the audio signals during the inserting;
detect whether a target audio signal having the insertion time stamp exceeding a preset discarding time exists in the container at a preset cancellation cycle; and
in response to determining that the target audio signal exists, set an element value corresponding to the target audio signal in the container to zero.

8. The electronic device of claim 7, wherein the one or more processors are configured to calculate the amplitude for the target sound zone according to the amplitudes of all stored audio signals by:
calculating an average value of the amplitudes of all stored audio signals having non-zero element values in the container, and calculating the current amplitude for the target sound zone according to the average value.

9. A non-transitory computer readable storage medium having a computer program stored thereon, wherein when the computer program is executed by a processor, the method for obtaining an amplitude for a sound zone is executed, the method comprising:
collecting speech data of a target sound zone in real time, the speech data comprising audio signals corresponding to a plurality of sampling points;
storing the audio signals by comparing an amplitude of a current audio signal to be stored with an amplitude of each stored audio signal to determine whether to store the current audio signal; and
calculating a current amplitude for the target sound zone according to amplitudes of all stored audio signals.

10. The non-transitory computer readable storage medium of claim 9, wherein comparing the amplitude of the current audio signal to be stored with the amplitude of each stored audio signal to determine whether to store the current audio signal comprising:
inserting the audio signals corresponding to the plurality of sampling points into a prebuilt container in sequence; and
during the inserting, assigning the amplitude of the current audio signal to a minimum amplitude of inserted audio signals in the container, in response to determining that the amplitude of the current audio signal is greater than the minimum amplitude; and discarding the current audio signal, in response to determining that the amplitude of the current audio signal is less than or equal to the minimum amplitude.

11. The non-transitory computer readable storage medium of claim 10, wherein the method further comprises:
binding an insertion time stamp to an amplitude of each of the audio signals during the inserting;
detecting whether a target audio signal having the insertion time stamp exceeding a preset discarding time exists in the container at a preset cancellation cycle; and
in response to determining that the target audio signal exists, setting an element value corresponding to the target audio signal in the container to zero.

12. The non-transitory computer readable storage medium of claim 11, wherein calculating the amplitude for the target sound zone according to the amplitudes of all stored audio signals comprising:
calculating an average value of the amplitudes of all stored audio signals having non-zero element values in the container, and calculating the current amplitude for the target sound zone according to the average value.

* * * * *